USO10723427B1

United States Patent
Egleston et al.

(10) Patent No.: US 10,723,427 B1
(45) Date of Patent: Jul. 28, 2020

(54) OIL FILTER ASSEMBLIES

(71) Applicant: Brunswick Corporation, Mettawa, IL (US)

(72) Inventors: Robert Egleston, Stillwater, OK (US); Jody Peterson, Oshkosh, WI (US); Mark Glodowski, De Pere, WI (US)

(73) Assignee: Brunswick Corporation, Mettawa, IL (US)

(*) Notice: Subject to any disclaimer, the term of this patent is extended or adjusted under 35 U.S.C. 154(b) by 0 days.

(21) Appl. No.: 16/436,332

(22) Filed: Jun. 10, 2019

(51) Int. Cl.
| | |
|---|---|
| *B63H 20/00* | (2006.01) |
| *F01M 11/03* | (2006.01) |
| *F01M 11/04* | (2006.01) |
| *B01D 29/15* | (2006.01) |
| *B01D 35/00* | (2006.01) |
| *F01M 1/10* | (2006.01) |
| *F02B 61/04* | (2006.01) |

(52) U.S. Cl.
CPC ........... *B63H 20/002* (2013.01); *B01D 29/15* (2013.01); *B01D 35/005* (2013.01); *F01M 1/10* (2013.01); *F01M 11/03* (2013.01); *F01M 11/04* (2013.01); *F02B 61/045* (2013.01); *B01D 2201/0415* (2013.01); *B01D 2201/291* (2013.01); *F01M 2001/1007* (2013.01); *F01M 2011/031* (2013.01)

(58) Field of Classification Search
CPC ........ B63H 20/002; B01D 29/15; F01M 1/10; F01M 11/03; F01M 11/04; F02B 61/045
See application file for complete search history.

(56) References Cited

U.S. PATENT DOCUMENTS

| | | | |
|---|---|---|---|
| 4,594,970 A | 6/1986 | Baars et al. | |
| 5,516,425 A | 5/1996 | Brieden et al. | |
| 5,704,819 A | 1/1998 | Isogawa | |
| 5,769,036 A | 6/1998 | Takahashi et al. | |
| 5,814,215 A * | 9/1998 | Bruss | B01D 29/15 210/130 |
| 5,997,372 A | 12/1999 | Idzikowski et al. | |
| 6,287,464 B1 * | 9/2001 | Gu | B01D 29/21 210/179 |

(Continued)

FOREIGN PATENT DOCUMENTS

| | | |
|---|---|---|
| DE | 10302934 A1 | 7/2004 |
| JP | 3795157 B2 | 7/2006 |

*Primary Examiner* — Stephen P Avila
(74) *Attorney, Agent, or Firm* — Andrus Intellectual Property Law, LLP

(57) ABSTRACT

An oil filter assembly for an engine of an outboard motor includes a base having a high-pressure inlet port, a filter-mounting interface for receiving a filter, and a drain-back port for receiving a drain-back insert of the filter. The base includes an engine-mounting interface for mounting the base to the engine, which includes a high-pressure outlet port and a low-pressure outlet port providing oil to the engine. The base provides fluid communication between the high-pressure inlet port and an inlet side of the filter and between an outlet side of the filter and the high-pressure outlet port when the filter is installed and the drain-back insert is within the drain-back port. The base provides fluid communication between the drain-back port and the low-pressure outlet port when the drain-back insert is not within the drain-back port. A clean oil fill passageway is in fluid communication with the low-pressure outlet port.

20 Claims, 12 Drawing Sheets

(56) References Cited

U.S. PATENT DOCUMENTS

| | | | |
|---|---|---|---|
| 6,488,845 B1 * | 12/2002 | Neufeld | B01D 29/21 210/232 |
| 6,623,319 B2 | 9/2003 | Isogawa | |
| 7,185,643 B2 | 3/2007 | Gronberg et al. | |
| 7,531,090 B1 * | 5/2009 | Stamey, Jr. | B01D 35/153 210/234 |
| 8,522,415 B2 * | 9/2013 | Macey | B01D 27/08 123/196 A |
| 10,343,090 B2 * | 7/2019 | Morris | B01D 29/96 |

* cited by examiner

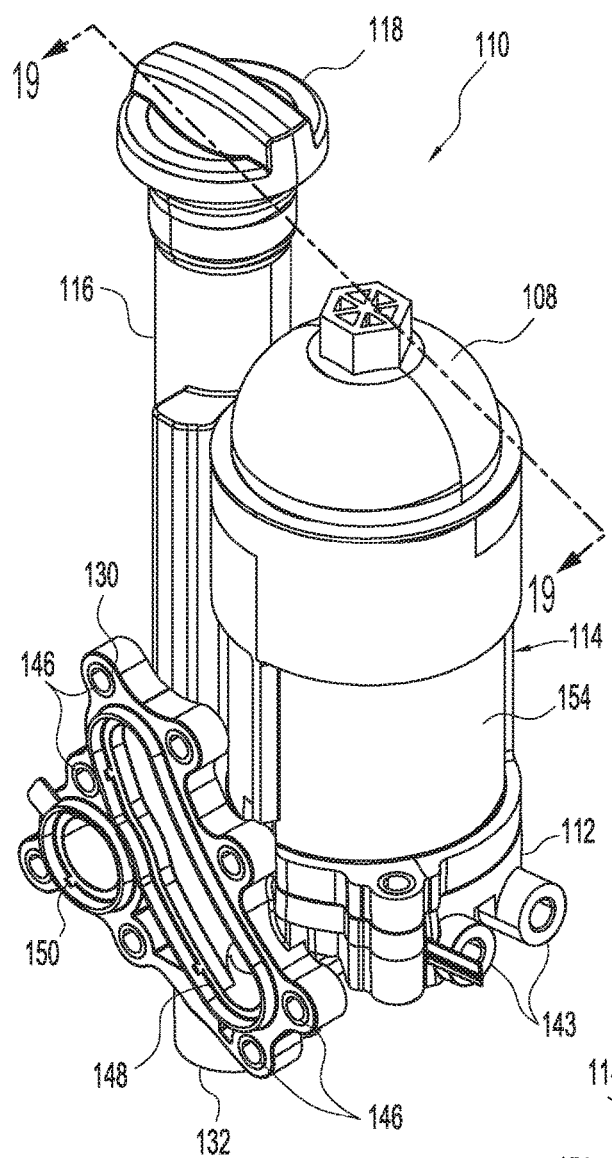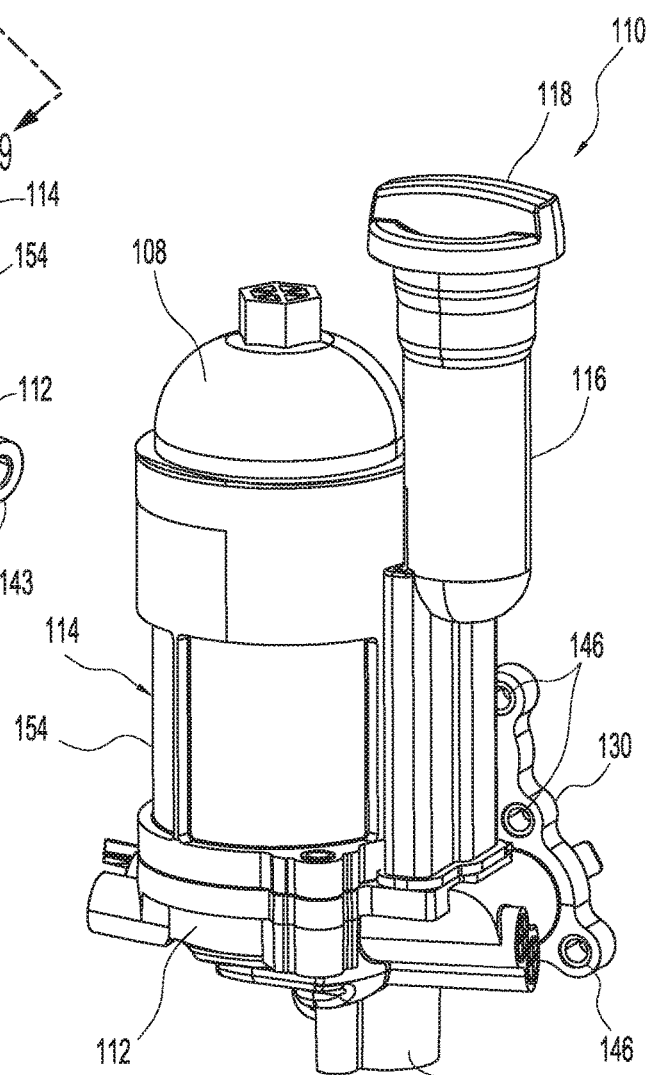
FIG. 13
FIG. 14

OIL FILTER ASSEMBLIES

FIELD

The present disclosure relates to oil filter assemblies, and more specifically to oil filter assemblies for marine outboard drives.

BACKGROUND

U.S. Pat. No. 5,997,372, which is hereby incorporated by reference herein, discloses a four-cycle internal combustion engine with a scavenge pump and a pressure pump that are both attached for rotation to a crank shaft of the engine. The inlets and outlets of the scavenge pump and pressure pump are located at positions within the structure of the internal combustion engine which inhibits the drainage of lubricant from a lubricant reservoir to the engine when the outboard motor is either tilted at an extreme angle from vertical or stored in a horizontal position. The scavenge pump and the pressure pump can be gerotor pumps and can either be located proximate each other at one side of the engine or displaced from each other on opposite sides of the engine.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example, an oil filter assembly for an internal combustion engine of an outboard motor includes a base having a high-pressure inlet port receiving oil into the base, a filter-mounting interface configured to receive a filter, and a drain-back port configured to receive a drain-back insert of the filter. The base also includes an engine-mounting interface configured to mount the base to the engine, the engine-mounting interface including a high-pressure outlet port and a low-pressure outlet port providing oil from the base to the engine. The base provides fluid communication between the high-pressure inlet port and an inlet side of the filter and between an outlet side of the filter and the high-pressure outlet port when the filter is installed on the filter-mounting interface and the drain-back insert is within the drain-back port. The base provides fluid communication between the drain-back port and the low-pressure outlet port when the drain-back insert is not within the drain-back port. The assembly also includes a clean oil fill passageway in fluid communication with the low-pressure outlet port.

According to another example, an oil filter assembly for an internal combustion engine of an outboard motor includes a base having a first passageway for receiving oil into the base, a first cup for receiving oil from the first passageway and for delivering oil to an upstream side of a filter when the filter is installed on the base, a second cup for receiving oil from a downstream side of the filter when the filter is installed on the base, and a second passageway for delivering oil from the second cup to the engine. The base also includes a third passageway for delivering oil from the first and second cups to the engine when the filter is not installed on the base. A fourth passageway communicates with the third passageway. The fourth passageway receives clean oil from a clean oil fill passageway. The base is configured to be mounted to the engine such that the second and third passageways are in fluid communication with the engine.

BRIEF DESCRIPTION OF THE DRAWINGS

Examples of oil filter assemblies for a marine outboard engine are described with reference to the following Figures. The same numbers are used throughout the Figures to reference like features and like components.

FIGS. 13 and 14 are different perspective views of another embodiment of an oil filter assembly according to the present disclosure.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different components and assemblies described herein may be used or sold separately or in combination with other components and assemblies. Various equivalents, alternatives, and modifications are possible within the scope of the appended claims. Each limitation in the appended claims is intended to invoke interpretation under 35 USC § 112(f)

only if the terms "means for" or "step for" are explicitly recited in the respective limitation.

Figure 1:
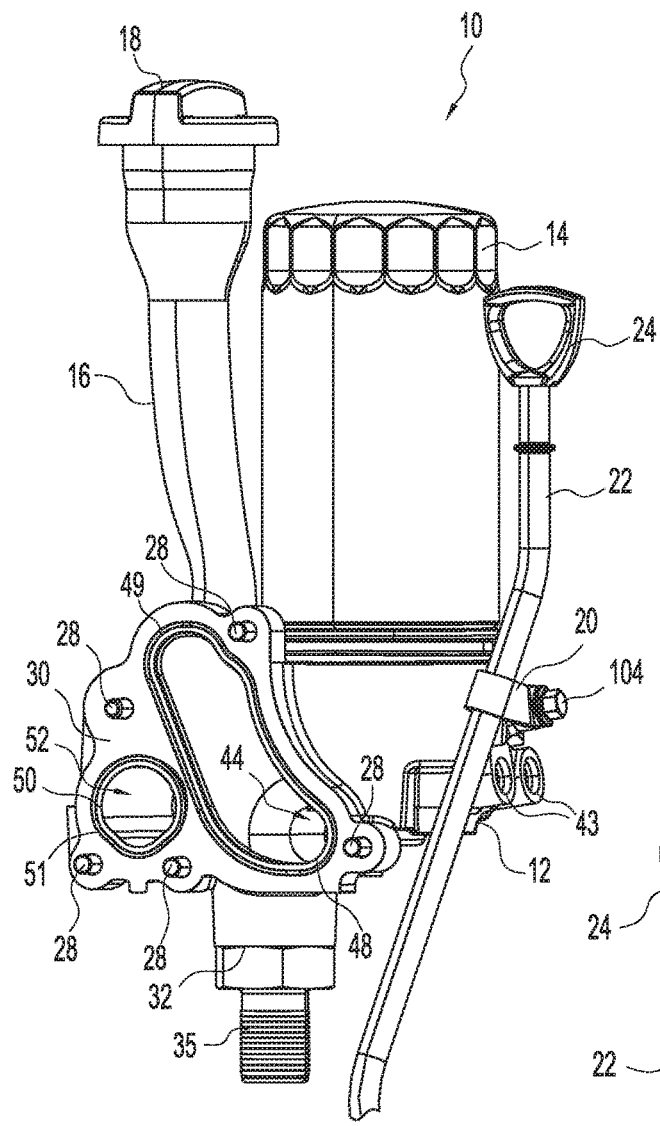
FIGS. 1 and 2 are different perspective views of one example of an oil filter assembly according to the present disclosure.
Figure 2:
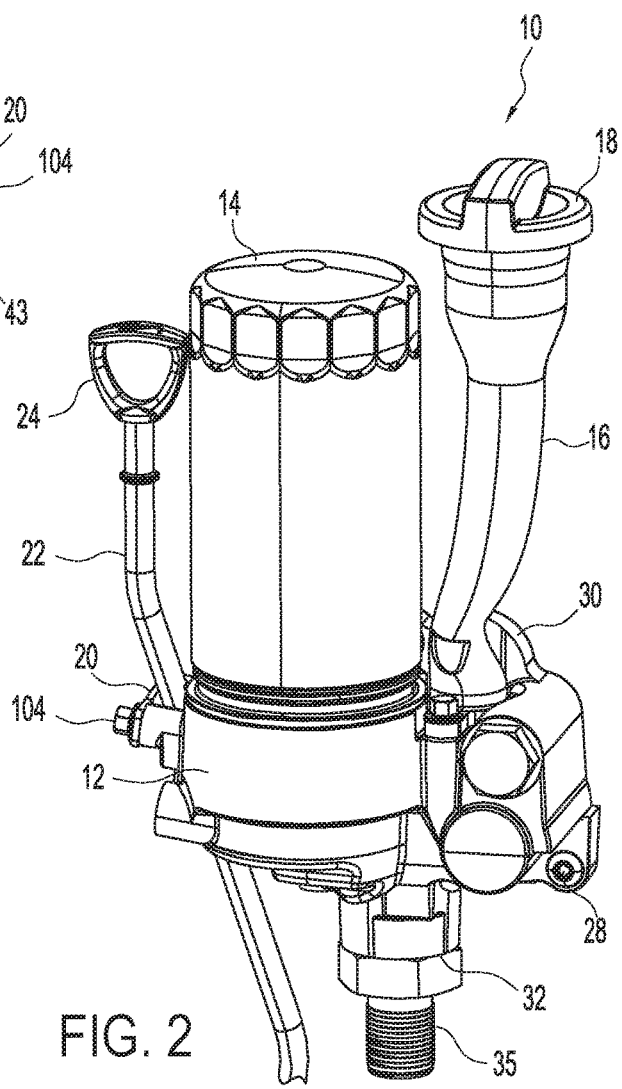

FIGS. 1 and 2 show one example of an oil filter assembly 10 for an internal combustion engine 26 (see FIGS. 21 and 22) of an outboard motor. The oil filter assembly 10 comprises a base 12 to which several different components are connected, including a filter 14, a clean oil fill tube 16 closed by a fill tube cap 18, and a clip 20 holding an oil level test tube 22 into which a dipstick 24 is inserted. In some examples, the clean oil fill tube 16 and/or clip 20 are integral with the base 12. For purposes of orientation, referring briefly to FIGS. 21 and 22, the oil filter assembly 10 can be mounted to a side of an engine 26 of an outboard motor by way of bolts 28 extending through an engine-mounting interface 30 of the base 12 (FIG. 1).

Figure 3:
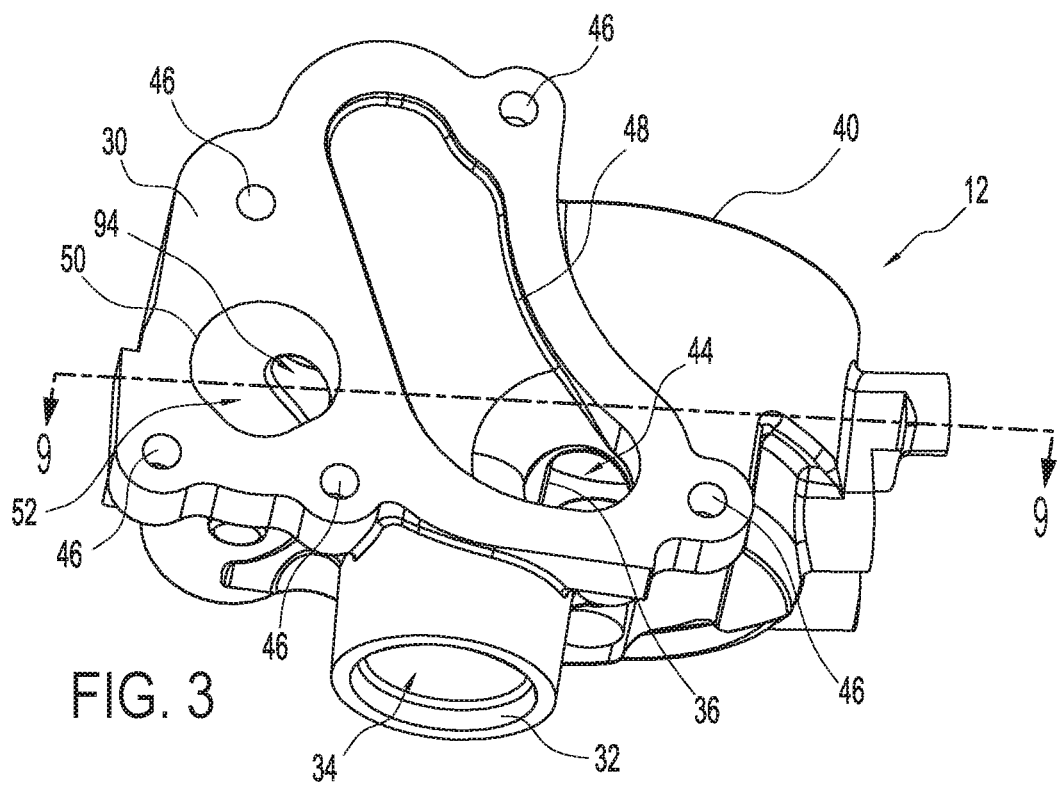
FIG. 3 is a bottom perspective view of a base of the oil filter assembly of FIGS. 1 and 2.
Figure 4:
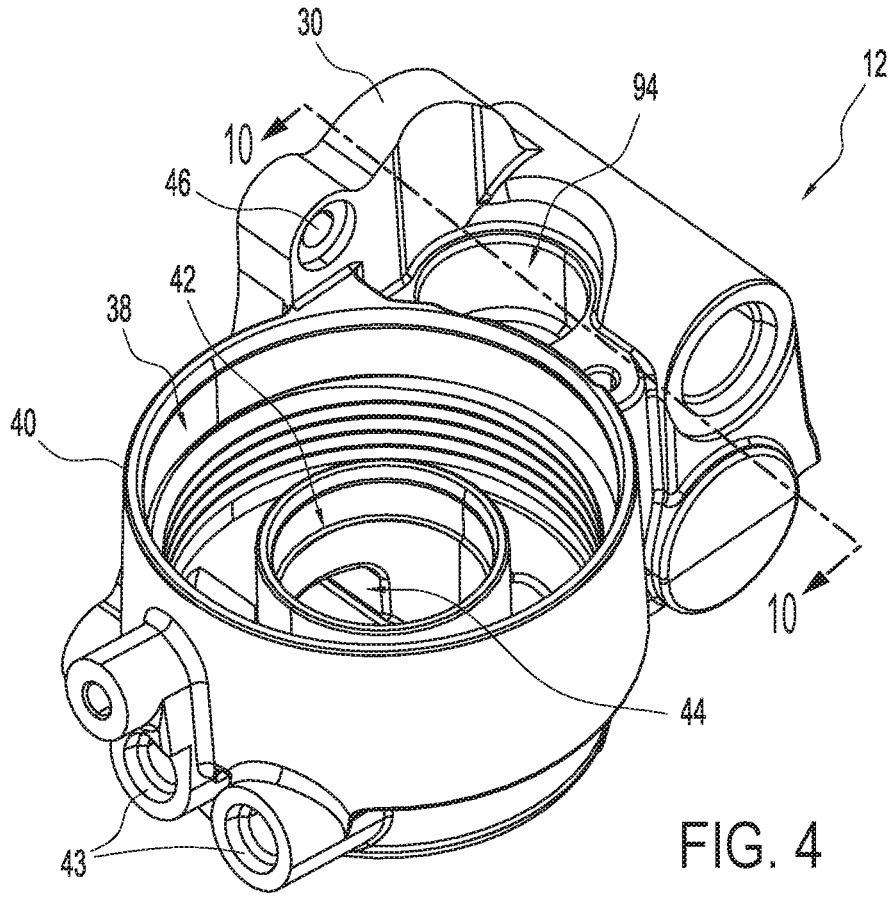
FIG. 4 is a top perspective view of the base of FIG. 3.

Turning to FIGS. 3 and 4, the base 12 has a high-pressure inlet port 32, which leads to a first passageway 34 for receiving oil into the base 12. Those having ordinary skill in the art will understand that the oil is delivered to the high-pressure inlet port 32 via a tube (not shown) and a fitting 35 (FIGS. 1 and 2) from an oil pump located elsewhere on the outboard motor or aboard a vessel to which the outboard motor is to be mounted. Pressurized oil flows through the first passageway 34 defined in the base 12 to an outlet port 36 (see also FIG. 9). The outlet port 36 leads into a first cup 38 defined in the base 12 for receiving oil from the first passageway 34.

The first cup 38 defines a filter-mounting interface 40 configured to receive the filter 14, as will be described further herein below. The first cup 38 delivers oil to an upstream side of the filter 14 when the filter 14 is installed on the base 12. A second cup 42 is defined by the base 12 and receives oil from a downstream side of the filter 14 when the filter 14 is installed on the base 12. (Such flow of oil through the filter 14 will also be described further herein below.) The base 12 also defines a second passageway 44 for delivering filtered oil from the second cup 42 to the engine 26. For the sake of completeness, the base 12 also includes ports 43 in fluid communication with the first cup 38 for interfacing with sensors such as temperature and pressure transducers.

The engine-mounting interface 30 of the base 12 is, as noted hereinabove, configured to mount the base 12 to the engine 26, such as by way of bolts 28 extending through holes 46. The engine-mounting interface 30 includes a high-pressure outlet port 48 and a low-pressure outlet port 50 providing oil from the base 12 to the engine 26. For example, by way of the second passageway 44, the base 12 provides fluid communication between the downstream or outlet side of the filter 14 and the high-pressure outlet port 48 when the filter 14 is installed on the filter-mounting interface 40. However, as will be described herein below, the base 12 also includes a third passageway 52 for delivering oil from the first and second cups 38, 42 to the engine 26 when the filter 14 is not installed on the base 12. Thus, the base 12 is configured to be mounted to the engine 26 such that the second and third passageways 44, 52 are in fluid communication with the engine 26, such as by way of the high-pressure outlet port 48 and low-pressure outlet port 50, respectively. As shown in FIG. 1, gaskets 49, 51 on each of these outlet ports 48, 50, respectively, provide fluid-tight communication between the base 12 and the engine 26. From the low-pressure outlet port 50, oil enters the bedplate of the engine 26 and then drains into an oil sump. From the high-pressure outlet port 48, oil is fed to locations on the engine 26 that require pressure lubrication, and then eventually back to the sump.

Figure 5:
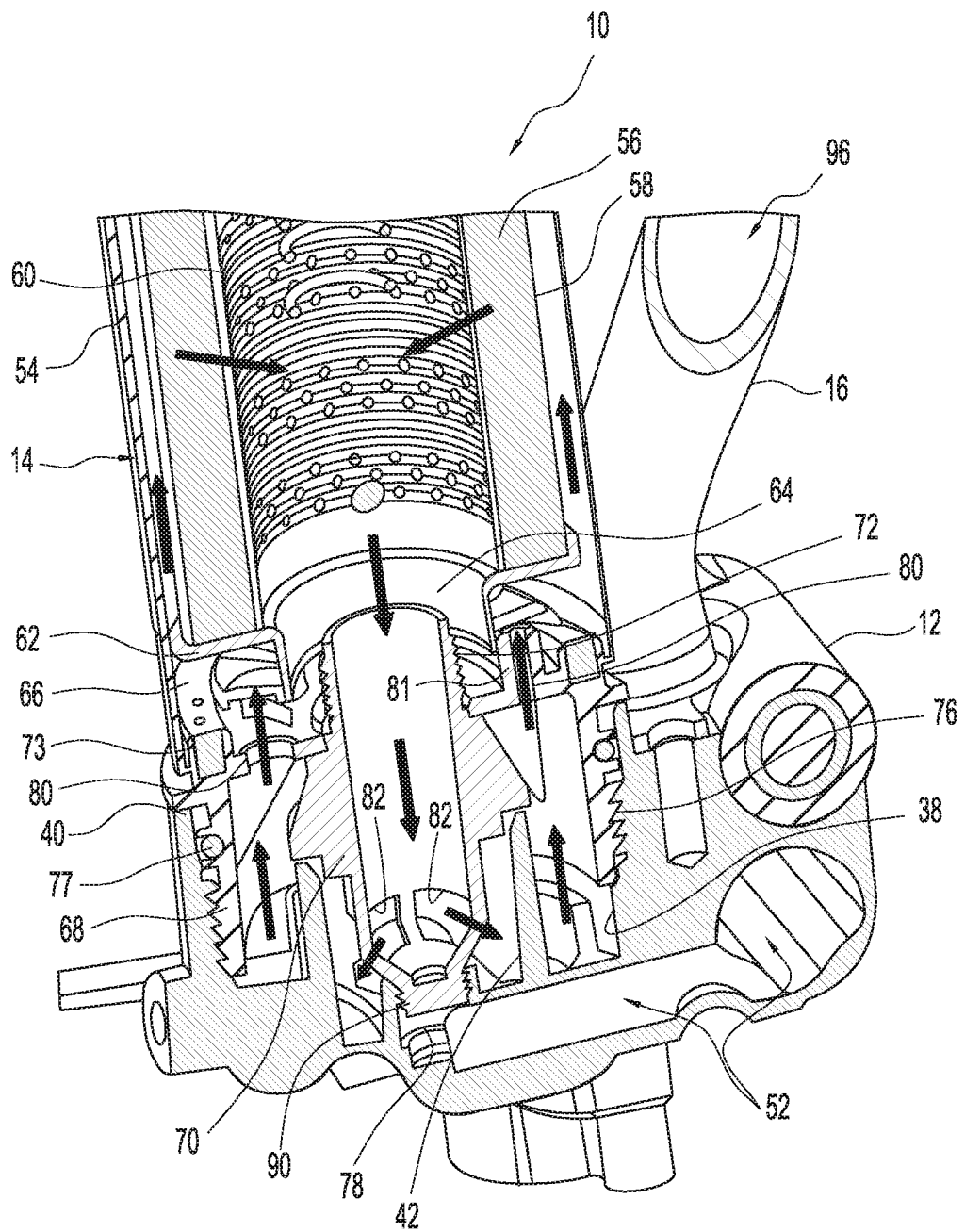
FIG. 5 is a cross-sectional view of the oil filter assembly of FIGS. 1 and 2.

Now turning to FIG. 5, further details of oil flow through the oil filter assembly 10 will be described. FIG. 5 shows an instance in which the filter 14 is installed on the base 12 in the filter-mounting interface 40. In this example, the filter 14 is a spin-on type filter. The filter 14 includes a cylindrical housing 54, such as made of plastic, which holds a cylindrical filter element 56 having an outer upstream side 58 and a hollow core defining an inner downstream side 60. In one example, the filter element 56 may be a pleated paper media, although other filter elements known in the art are contemplated. An end cap 62 supports the filter element 56 and locates the filter element 56 within the housing 54, such as by way of a cylindrical neck 64 on the end cap 62 that is supported by a bottom 66 of the housing 54.

Figure 6:
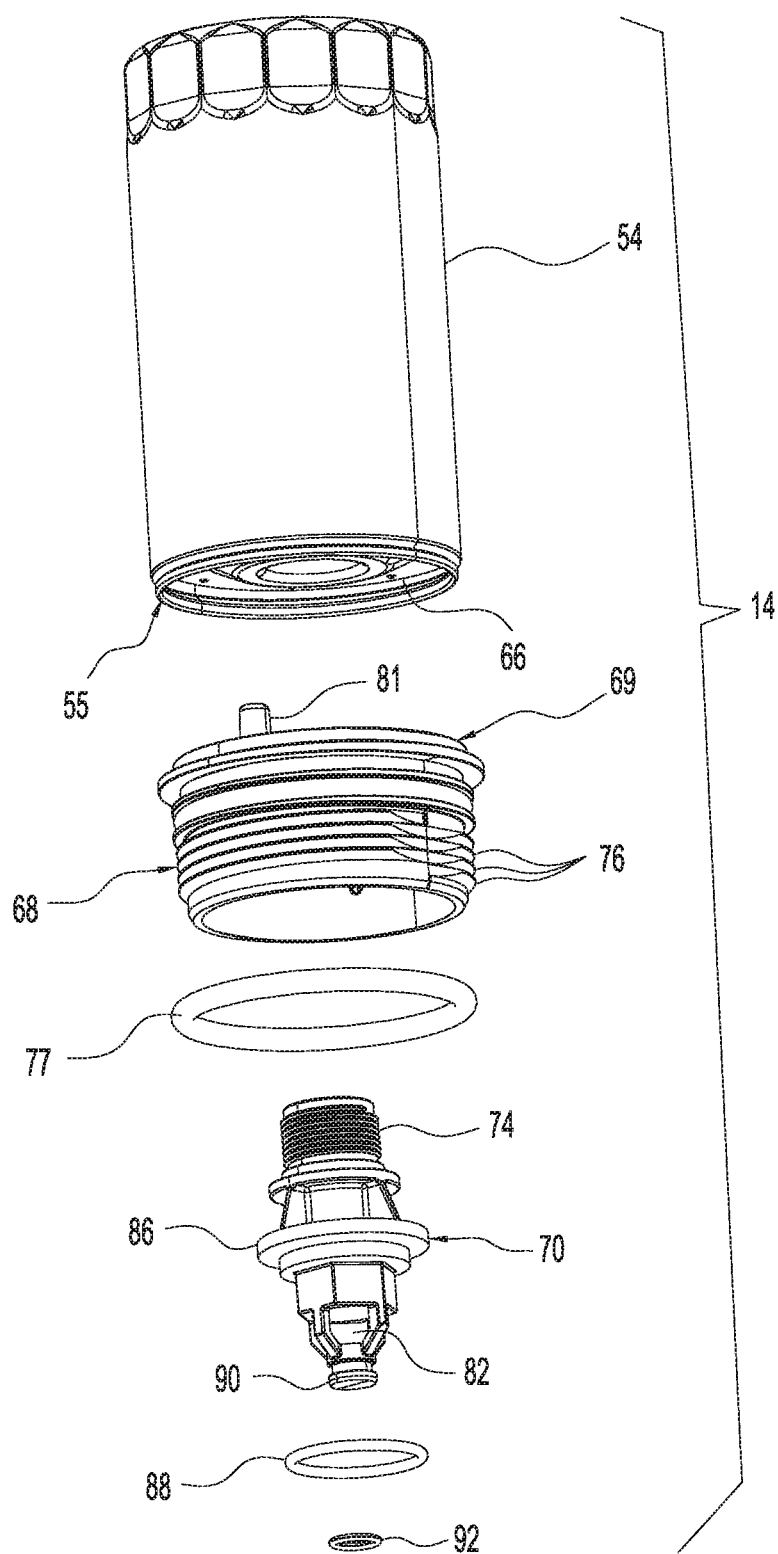
FIG. 6 is an exploded view of a filter for use in the oil filter assembly of FIGS. 1-5.

Referring now also to FIG. 6, the filter 14 further includes an adapter 68 coupled to a lower end 55 of the housing 54 that is proximate the end cap 62. A drain-back insert 70 of the filter 14 is connected through the adapter 68 to the end cap 62 by way of insertion into the neck 64, and thereby couples the adapter 68 to the housing 54. More specifically, the neck 64 of the end cap 62 has a central opening 72 into which a neck 74 of the drain-back insert 70 fits by way of threading, an interference fit, or a snap fit in order to attach the drain-back insert 70 to the end cap 62. In this example, the neck 74 is shown as being threaded for making such a connection, and thus the inside surface of the central opening 72 in the neck 64 is correspondingly threaded. The lower end 55 of the housing 54 and the upper end 69 of the adapter 68 are press-fit together as the drain-back insert 70 is threaded into the opening 72, and a seal 73 is pressed therebetween to provide a fluid-tight connection.

FIG. 5 shows an instance in which the filter 14 has been assembled to the base 12, such as by screwing the filter 14 onto the filter-mounting interface 40 of the first cup 38, which comprises internal threading (see FIG. 4) to match the external threading 76 on the adapter 68. An o-ring 77 ensures a fluid-tight connection. Upon completion of threading the filter 14 onto the filter-mounting interface 40, the drain-back insert 70 is received in a drain-back port 78 of the base 12. The drain-back port 78 is centrally situated within the second cup 42 and is configured (sized, shaped, and located) to receive the drain-back insert 70 of the filter 14. Further details of the drain-back port 78 will be described herein below.

Figure 7:
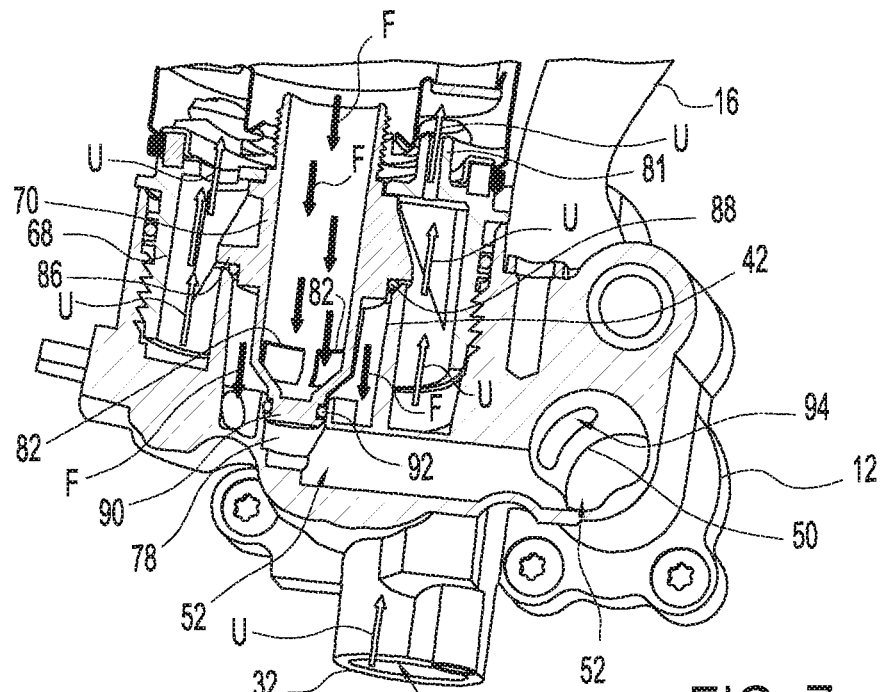
FIG. 7 is a partial cross-sectional view of the oil filter assembly of FIGS. 1-5, wherein the filter of FIG. 6 is installed on the base.

Now referring to FIGS. 5 and 7, flow of oil through the base 12 and filter 14 will be described. As noted herein above, oil enters the base 12 by way of the high-pressure inlet port 32, after which it flows through the first passageway 34 and into the first cup 38 via the outlet port 36. When the filter 14 is installed on the base 12, the adapter 68 is threaded into the first cup 38, and oil therefore flows through the adapter 68, out of holes 80 therein, and into the housing 54 through holes (aligned with holes 80) in the bottom 66 thereof. As shown, one of the holes 80 can be defined through an anti-rotation pin 81 on the adapter 68. Insertion of the anti-rotation pin 81 into a corresponding hole in the bottom 66 of the housing 54 ensures that the holes 80 in the adapter 68 and the holes in the housing 54 stay aligned, as well as prevents the housing 54 from coming loose from the drain-back insert 70 when the filer 14 is spun off the filter-mounting interface 40. Oil then enters the space between the housing 54 and the upstream side 58 of the filter element 56, and due to pressure from the upstream pump, flows through the filter element 56 to the downstream side 60 thereof. Oil continues to flow through the neck 64 of the end cap 62 and through the hollow core of the drain-back insert 70, finally exiting through annular openings 82 near a lower end of the drain-back insert 70 into the second cup 42 defined in the base 12. Oil in the second cup 42 exits the base 12 by way of the high-pressure outlet port 48, such as by way of an outlet passageway 84 shown in FIG. 9. The drain-back insert 70 prevents oil from flowing into the third passageway 52 when the filter 14 is installed on the base 12, as the lower tip 90 of the drain-back insert 70 is located in the drain-back port 78.

General flow of oil in this manner, when the filter 14 is installed in the base 12, is shown by the arrows in FIG. 5. Such flow of oil is also shown in more detail in FIG. 7, in which unfiltered oil U is shown flowing through the adapter 68 of the filter 14, and filtered oil F is shown flowing through the hollow core of the drain-back insert 70 and out the annular openings 82 provided therein. Note that in this configuration, an annular shoulder 86 of the drain-back insert 70 interfaces with the top edge of the second cup 42 and is sealed thereto by way of an o-ring 88, thereby preventing unfiltered oil from flowing into the second cup 42.

Figure 8:
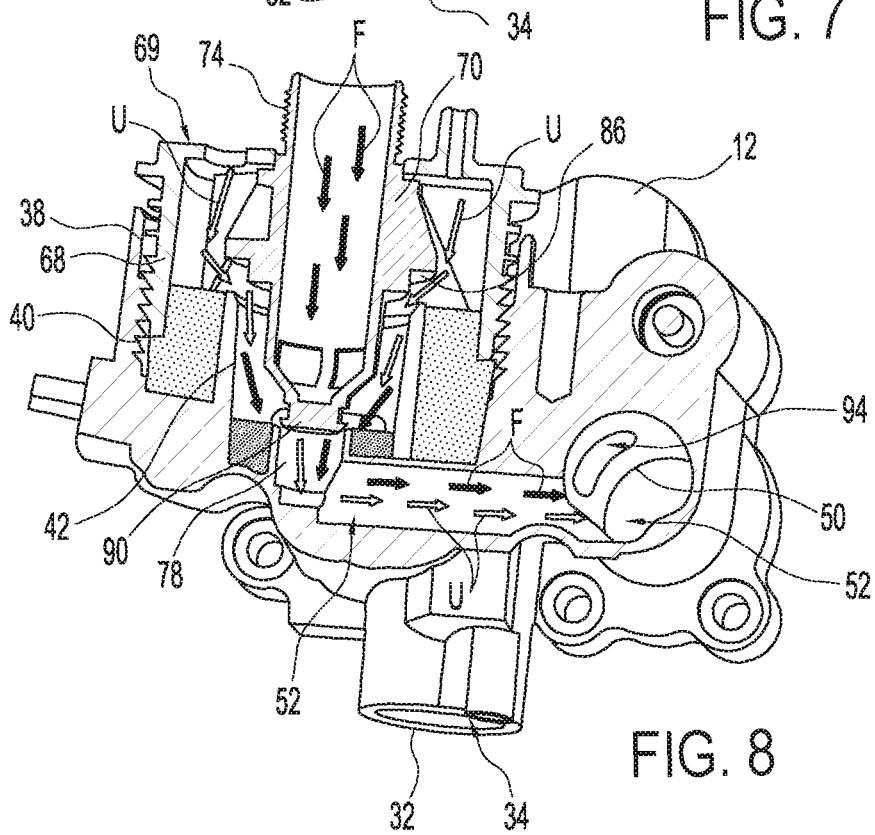
FIG. 8 is a partial cross-sectional view of the oil filter assembly of FIGS. 1-5, wherein the filter of FIG. 6 is partially removed from the base.

In contrast, now referring to FIG. 8, flow of oil through the base 12 when the filter 14 is not fully installed in the base 12 will be described. In the arrangement shown in FIG. 8, the adapter 68 has been partially unthreaded from the filter-mounting interface 40 provided in the first cup 38. Here, unfiltered oil U is no longer shown flowing into the first passageway 34 because the engine 26 is off, and the pump providing oil to the filter 14 is therefore also off. Instead, as the filter 14 is removed from the base 12, unfiltered oil U that is already in the first cup 38 flows down past the drain-back insert 70, the annular shoulder 86 of which is no longer located on the top edge of the second cup 42. Any filtered oil F that was in the filter 14 will flow, as shown by the arrows, through the drain-back insert 70 and into the second cup 42. Both filtered oil F and unfiltered oil U thereafter drain from the second cup 42 through the drain-back port 78. This is permitted by virtue of the fact that the lower tip 90 of the drain-back insert 70 and the o-ring 92 (FIG. 6) provided thereabout are no longer situated within the drain-back port 78. Filtered oil F and unfiltered oil U that drains from the second cup 42 through the drain-back port 78 thereafter enters the third passageway 52, after which it exits the base 12 into the engine 26 by way of the low-pressure outlet port 50. Thus, by way of the third passageway 52, the base 12 provides fluid communication between the drain-back port 78 and the low-pressure outlet port 50 when the drain-back insert 70 is not within the drain-back port 78. The drain-back insert 70, drain-back port 78, and third passageway 52 thereby provide for clean replacement of the filter 14, whereby any oil currently in the filter housing 54 can be drained to the engine 26 rather than pulled out with the filter 14 during replacement.

Those having ordinary skill in the art understand that not only does a filter 14 on an outboard engine 26 need to be replaced, but so does the oil. During such a process, clean oil must be provided to the engine 26. Thus, according to the present disclosure, and referring to FIGS. 4, 7, and 8, a fourth passageway 94 is provided communicating with the third passageway 52 and ultimately with the engine 26 via the low-pressure outlet port 50. The fourth passageway 94 in the base 12 is for receiving clean oil from a clean oil fill passageway. According to the present example, the clean oil fill tube 16 at least in part defines the clean oil fill passageway 96. Additional details of the clean oil fill passageway 96 will be described further herein below.

Figure 9:
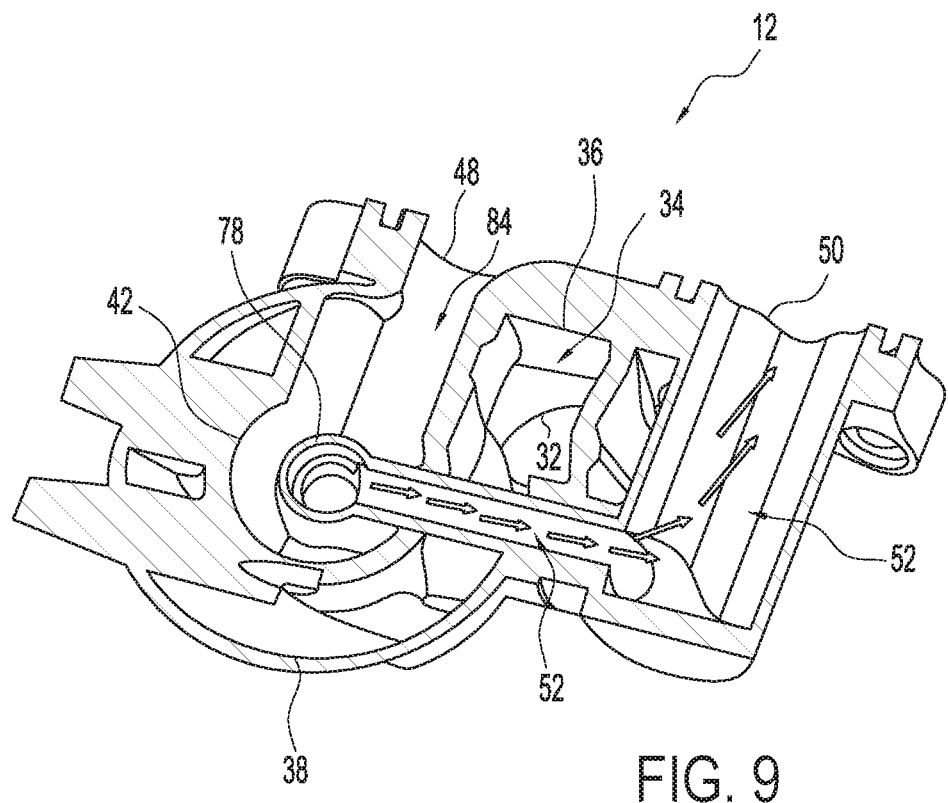
FIG. 9 is a cross-sectional view of the base of FIGS. 3 and 4, taken along the line 9-9 in FIG. 3.
Figure 10:
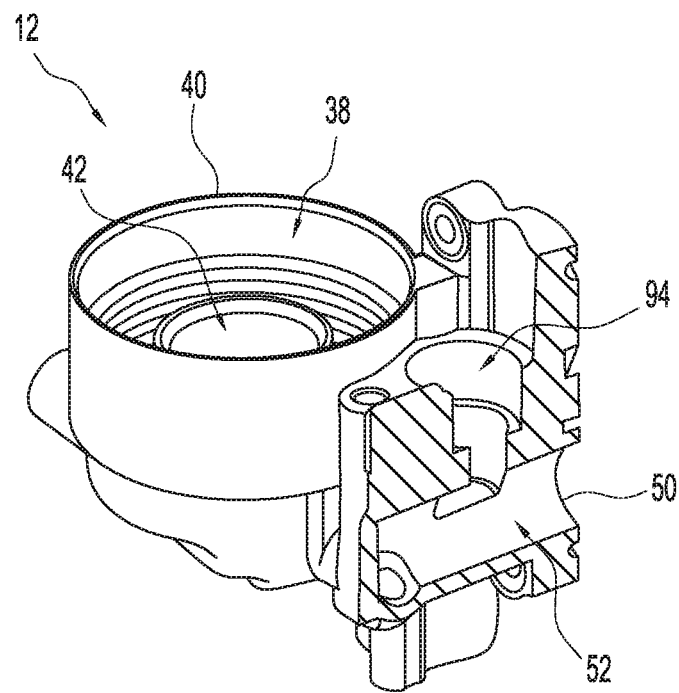
FIG. 10 is a cross-sectional view of the base of FIGS. 3 and 4, taken along the line 10-10 in FIG. 4.

FIGS. 9 and 10 show different cross-sectional views of the base 12. FIG. 9 shows flow of oil out of the drain-back port 78, through the third passageway 52, and out the low-pressure outlet port 50 to the engine 26. FIG. 10 shows how the fourth passageway 94 is provided in fluid communication with the third passageway 52 and thereby provides the clean oil fill passageway 96 in the clean oil fill tube 16 in fluid communication with the low-pressure outlet port 50.

Figure 11:
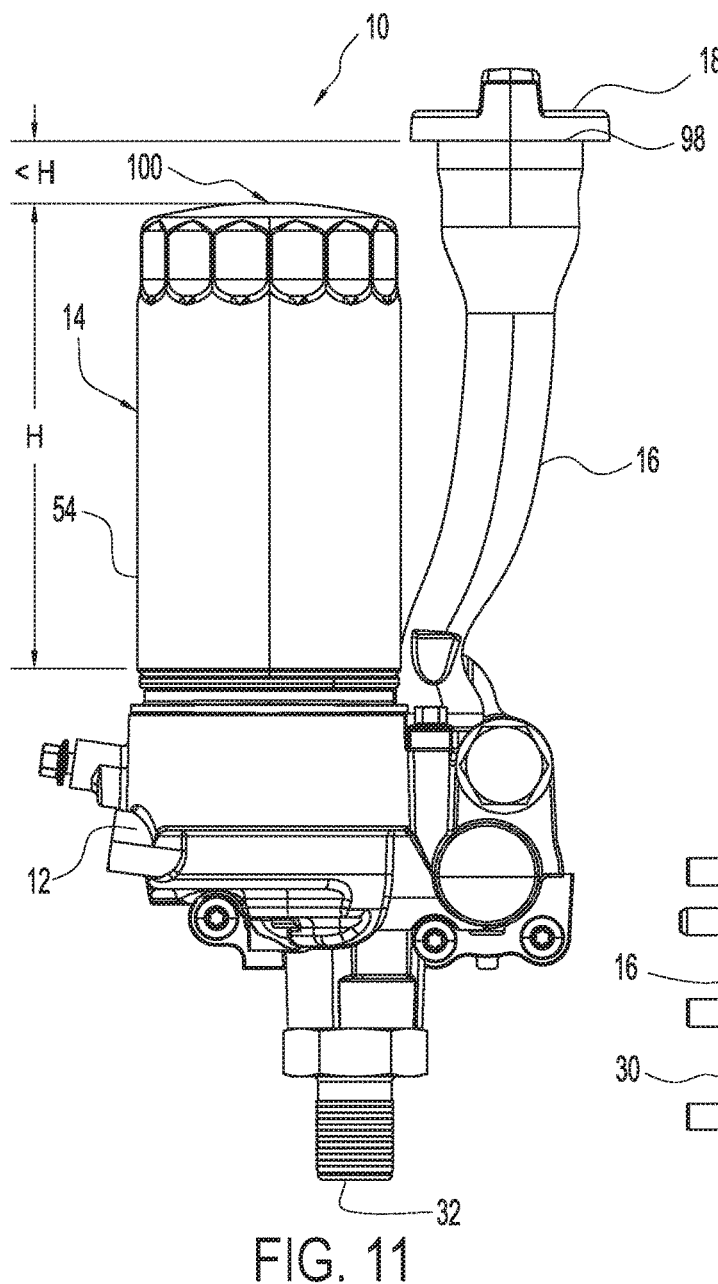
FIG. 11 is a side view of the oil filter assembly of FIGS. 1-5.
Figure 12:
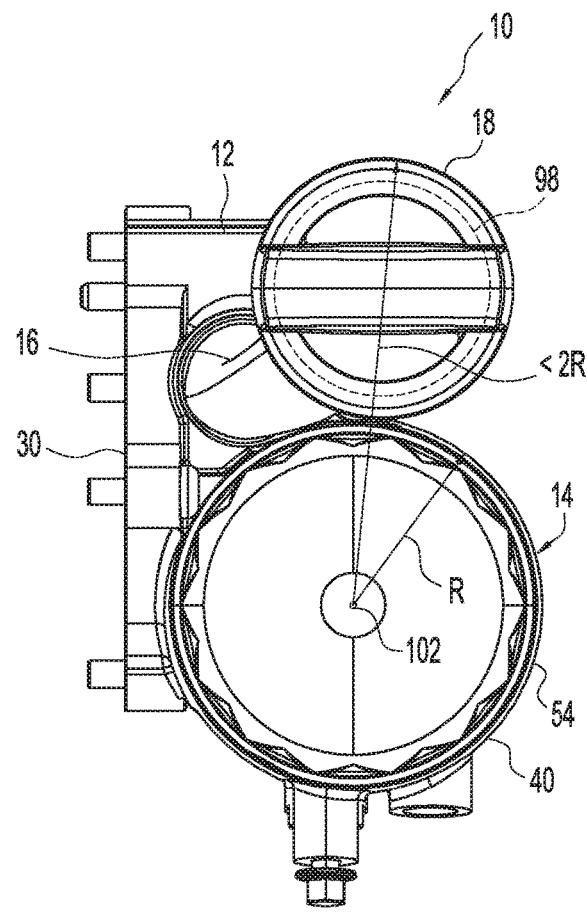
FIG. 12 is a top view of the oil filter assembly of FIGS. 1-5.

FIGS. 11 and 12 show how the clean oil fill tube 16 is configured to extend alongside the filter 14 when the filter 14 is installed on the filter-mounting interface 40 of the base 12. As noted hereinabove, the clean oil fill tube 16 at least in part defines the clean oil fill passageway 96, which leads to the fourth passageway 94 shown in FIG. 10. The cap 18 covers a clean oil fill opening 98, which is defined at a top end of the clean oil fill tube 16 and is in fluid communication with the clean oil fill passageway 96. As shown in FIG. 11, the clean oil fill opening 98 is configured to be higher than a top end 100 of the filter 14 when the filter 14 is installed on the filter-mounting interface 40 of the base 12. More specifically, the filter 14 includes the housing 54, having a height H, and the clean oil fill opening 98 is located fully within a boundary of H from the top end 100 of the filter housing 54 when the filter 14 is installed on the filter-mounting interface 40 and the oil filter assembly 10 is viewed in elevation. This ensures that the clean oil fill opening 98 is easily accessible for pouring oil therethrough, as it is located higher than the top end 100 of the filter 14. At the same time, the clean oil fill opening 98 is close enough to the top end 100 of the filter 14 that the oil filter assembly 10 remains compact and capable of fitting under the cowl of the outboard drive.

Referring to FIG. 12, also for purposes of compactness and ease of access, the clean oil fill opening 98 is located adjacent the filter-mounting interface 40 and the first cup 38 when the oil filter assembly 10 is viewed in plan. More specifically, the cylindrical housing 54 of the filter 14 has a center axis 102 and a radius R, and the clean oil fill opening 98 is located fully within a boundary of 2R from the center axis 102 of the filter housing 54 when the filter 14 is installed on the filter-mounting interface 40 and the oil filter assembly 10 is viewed in plan. This locates the clean oil fill opening 98 directly adjacent the location where the filter 14 is replaced, thereby providing ease of service, while at the same time maintaining compactness of the oil filter assembly 10.

Additionally, referring briefly back to FIGS. 1 and 2, the oil filter assembly 10 includes a clip 20 coupled to the base 12, such as by way of a bolt 104, that is configured to hold the tube 22 for testing the oil level in the engine 26 with the dipstick 24. This also locates the dipstick 24 close to the location where the filter 14 is replaced and close to the location where clean oil is provided to the engine 26, thereby providing for ease of service.

Now turning to FIGS. 13 and 14, an alternative embodiment of an oil filter assembly 110 will be described. Note that components of the oil filter assembly 110 that are the same or serve the same function as those of the embodiment of FIGS. 1-12 are labeled with a "1" in front of the corresponding reference number, but not all such components are described separately herein. Briefly, for purposes of orientation, the oil filter assembly 110 includes a filter 114 installed on a base 112, and a clean oil fill tube 116 covered by a cap 118. Although a clip is not shown for holding a tube for testing the oil level with a dipstick in this embodiment, it should be understood that a clip similar to that shown at 20 in FIG. 1 could be provided on the base 112. FIG. 13 shows the high-pressure outlet port 148 and the low-pressure outlet port 150 in the base 112. The engine-mounting interface 130 is also shown, with holes 146 for insertion of bolts for mounting the oil filter assembly 110 to the engine 26.

Figure 15:
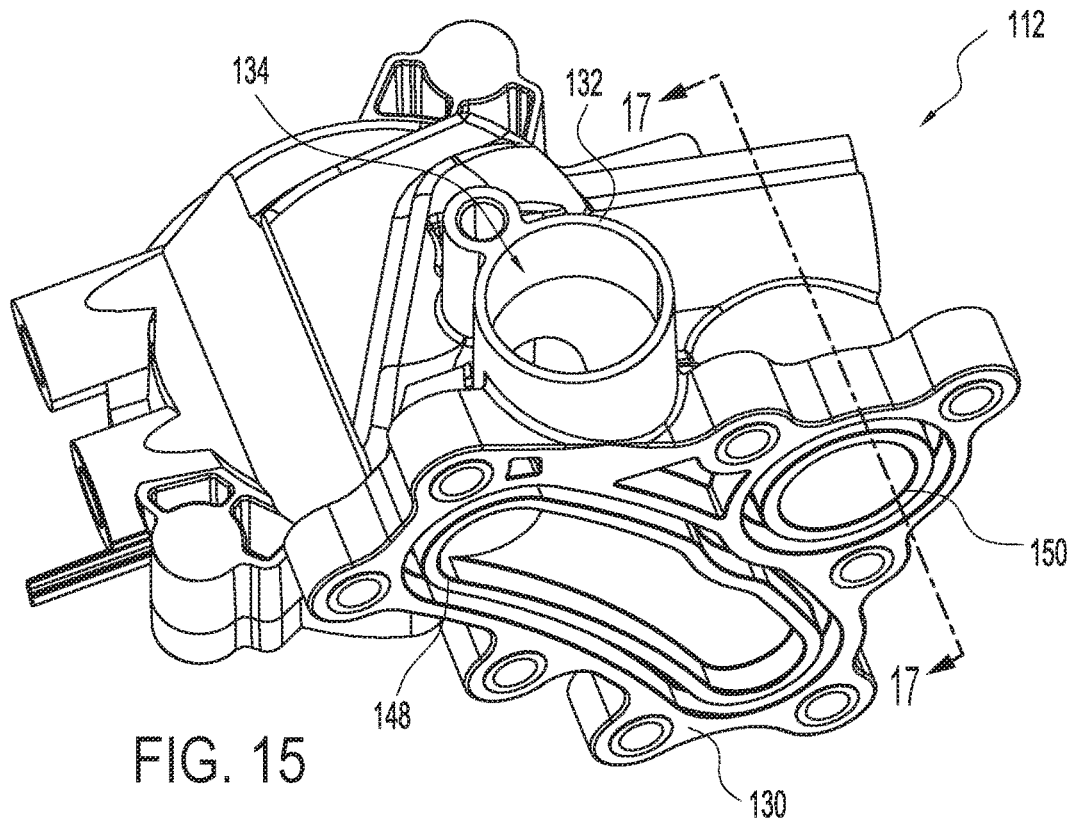
FIG. 15 is a bottom perspective view of a base of the oil filter assembly of FIGS. 13 and 14.

FIG. 15 shows a perspective bottom view of the base 112 in which the high-pressure outlet port 148, the low-pressure outlet port 150, the high-pressure inlet port 132, and the first passageway 134 can be seen. Each of these ports and passageways functions the same as the ports and passageways listed without the reference numeral "1" before them in the embodiment described with respect to FIGS. 1-12, and therefore will not be further described herein.

Figure 16:
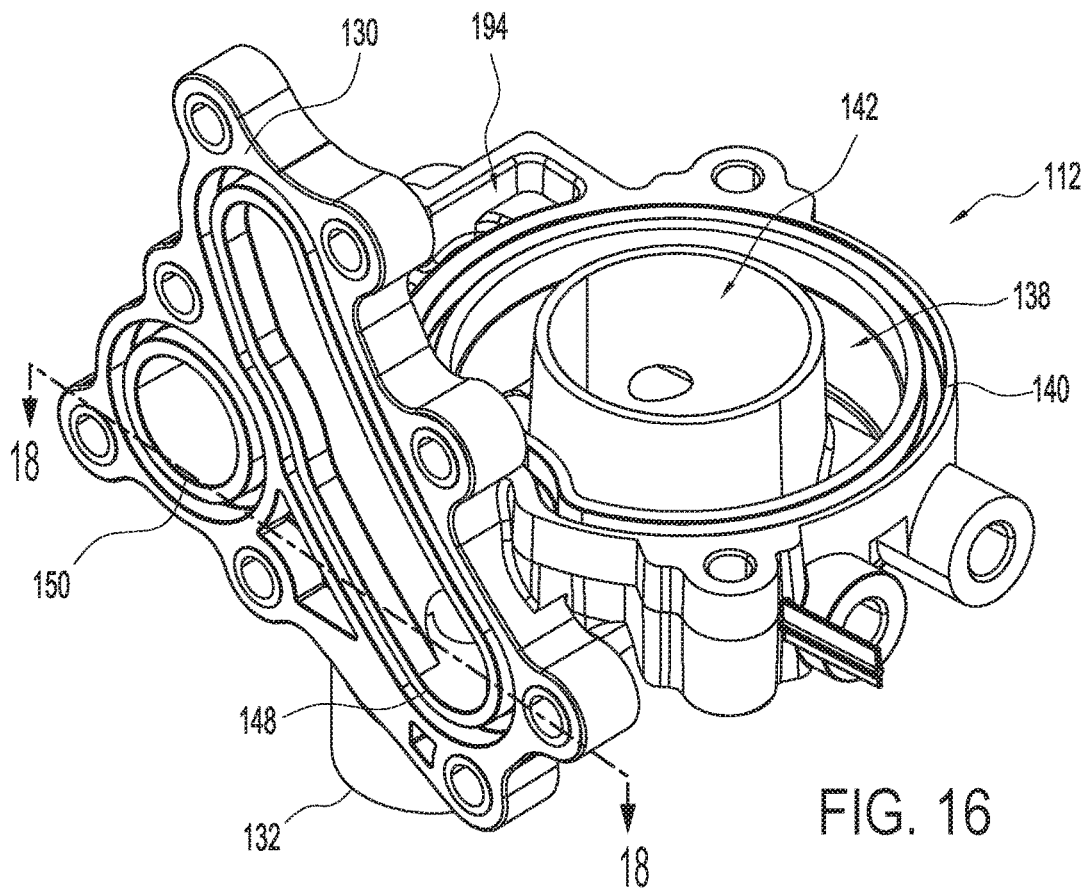
FIG. 16 is a top perspective view of the base of FIG. 15.

FIG. 16 shows a top perspective view of the base 112, including the first cup 138, the filter-mounting interface 140, the second cup 142, and the fourth passageway 194. Again, these passageways and cups function similarly to the passageways and cups of the embodiment described with respect to FIGS. 1-12 and will not be further described herein.

Figure 17:
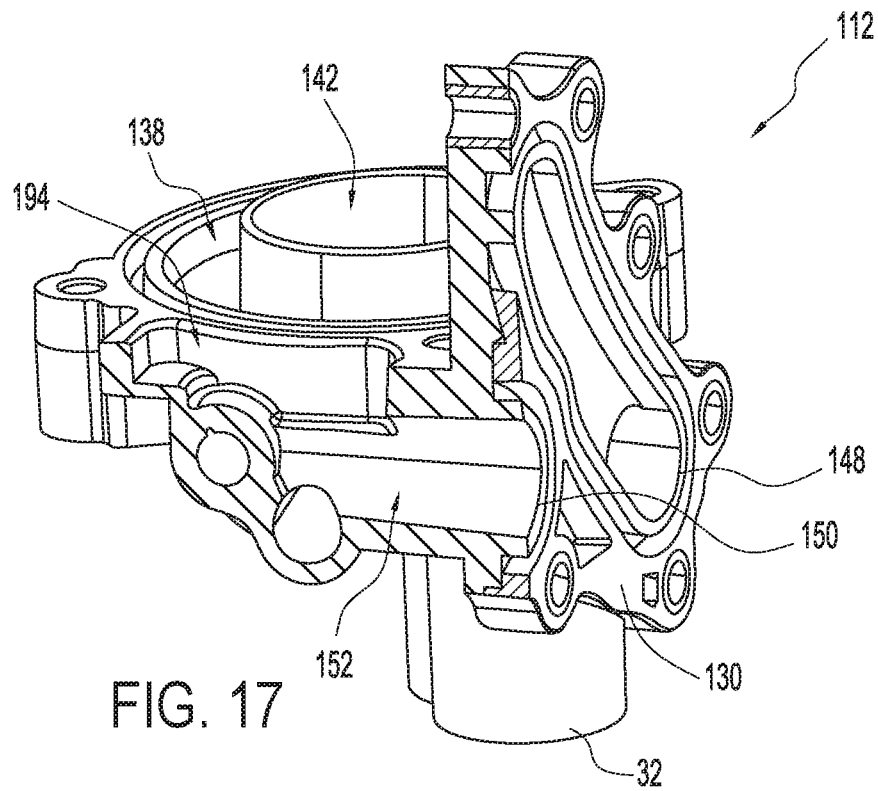
FIG. 17 is a cross-sectional view of the base of FIGS. 15 and 16, taken along the line 17-17 in FIG. 15.
Figure 18:
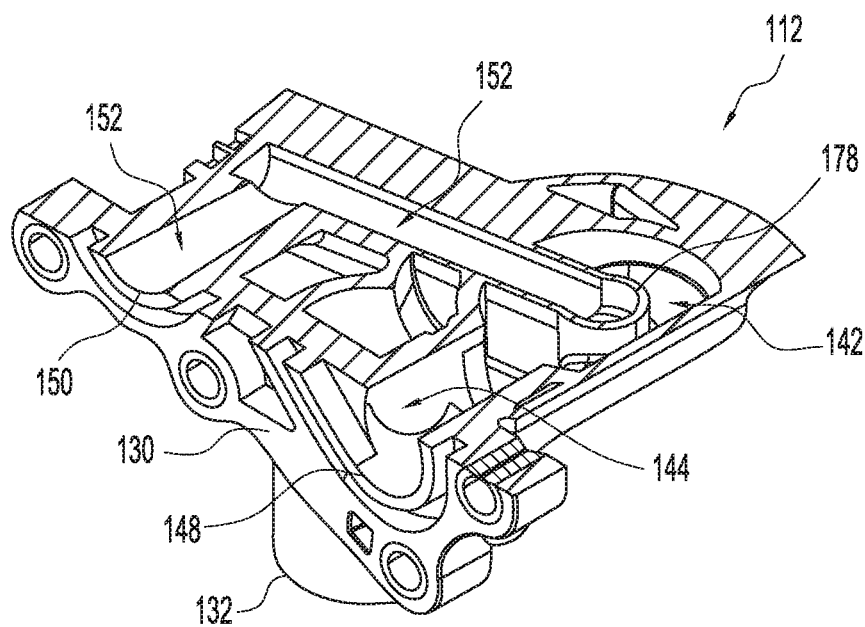
FIG. 18 is a cross-sectional view of the base of FIGS. 15 and 16, taken along the line 18-18 in FIG. 16.

FIG. 17 shows a cross-sectional view of the base 112, including the third passageway 152, which provides fluid communication between the fourth passageway 194 and the low-pressure outlet port 150. FIG. 18 meanwhile shows additional portions of the third passageway 152, including where the third passageway 152 intersects the drain-back port 178. FIG. 18 also shows where the second passageway 144 provides fluid communication from the second cup 142 to the high-pressure outlet port 148.

Figure 19:
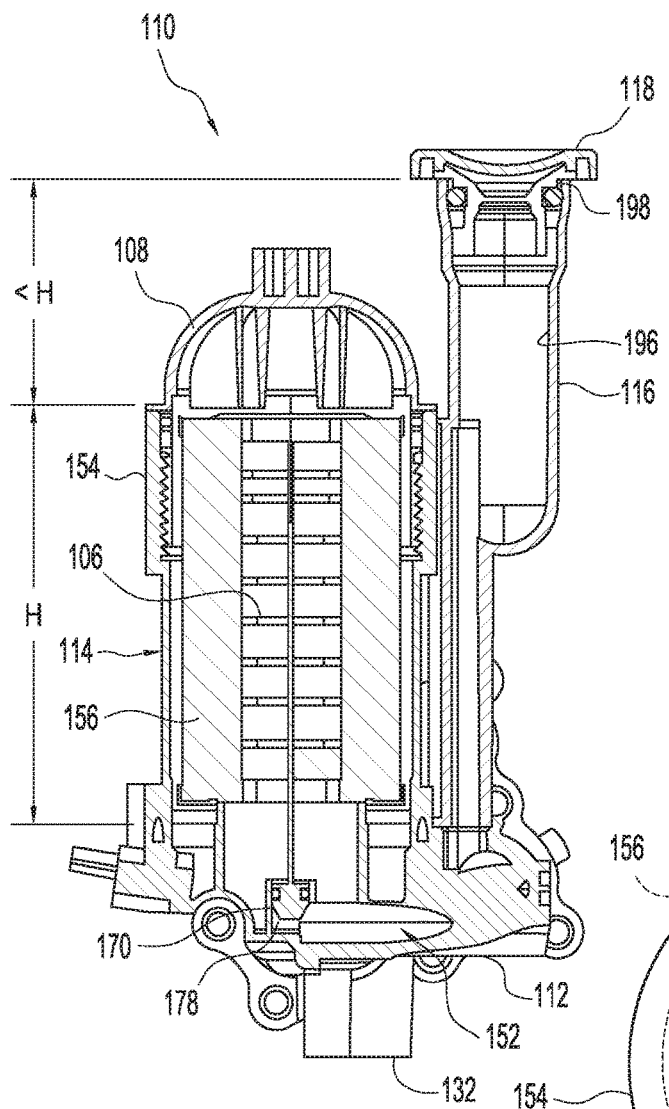
FIG. 19 is a cross-sectional view of the oil filter assembly of FIGS. 13 and 14, taken along the line 19-19 in FIG. 13.
Figure 20:
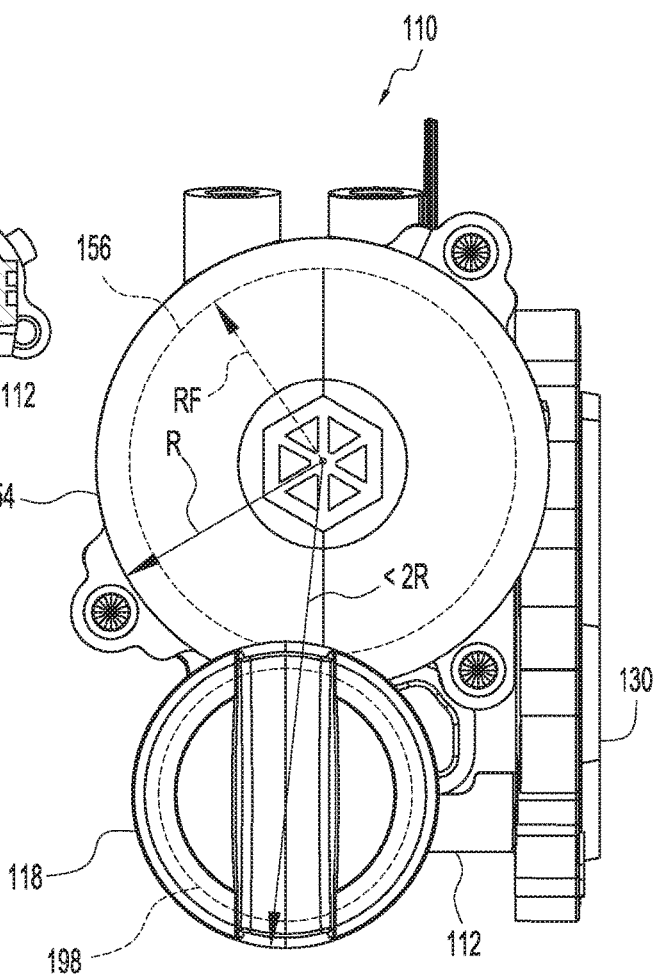
FIG. 20 is a top view of the oil filter assembly of FIGS. 13 and 14.

Turning to FIGS. 19 and 20, the clean oil fill tube 116 extends alongside the filter 114 and has a clean oil fill opening 198 located adjacent to the filter 114, thereby providing ease of access for service in this embodiment as well. However, in this embodiment, the filter 114 is not a spin-on filter, but rather is a cartridge-type filter, in which a cartridge core 106 is provided within a filter element 156. The lower end of the cartridge core 106 comprises the drain-back insert 170 which, similar to the first embodiment, is able to open or close the drain-back port 178 to allow or prevent passage of oil into the third passageway 152 in the base 112. Cartridge-type filters with drain-back inserts are well known in the art, and one example is shown in U.S. Pat. No. 5,814,215. However, other cartridge-type filters could be used.

FIG. 19 shows how the clean oil fill opening 198 in this embodiment is again located higher than the housing 154 of the filter 114, but again less than the height H of the filter housing 154 above the top end of the filter 114. In fact, even when accounting for the cap 108 of the cartridge-type filter 114, which screws onto the housing 154, the clean oil fill opening 198 is still located less than the height H of the filter housing 154 above the top end of the housing. In fact, the clean oil fill opening 198 is located less than the height of the filter element 156 itself above the top end of the filter element 156.

FIG. 20 shows how the clean oil fill opening 198 is located fully within 2R, where R is the radius of the filter housing 154, from the center axis of the filter housing 154. This locates the clean oil fill opening 198 adjacent the filter 114 and the filter-mounting interface 140 when the oil filter assembly 110 is viewed in plan. In fact, the clean oil fill opening 198 is located less than two times the radius RF of the filter element 156 from the center axis of the filter element 156.

Figure 21:
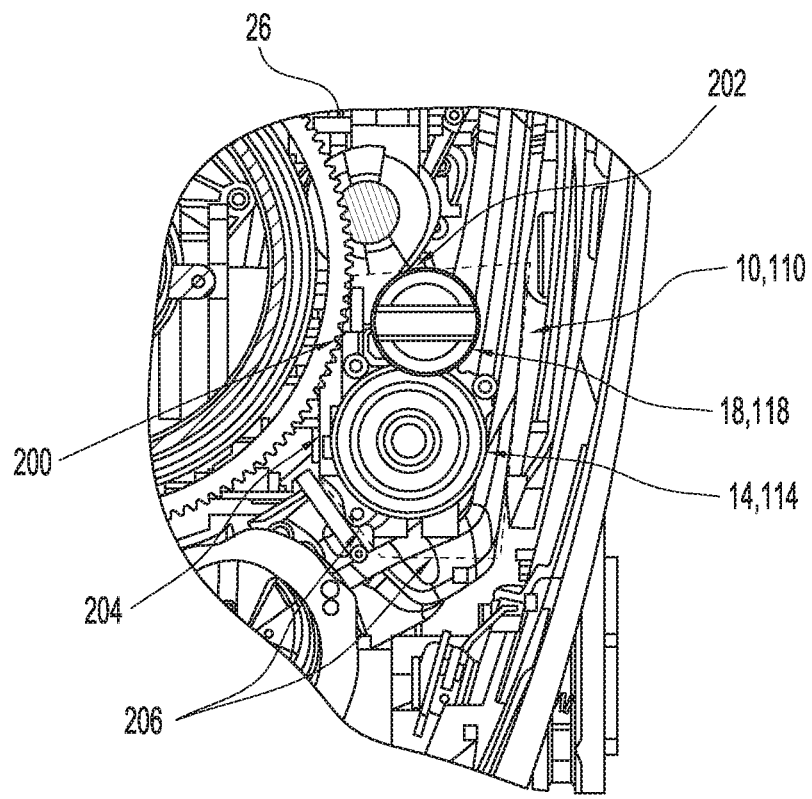
FIG. 21 is a top view of an oil filter assembly according to FIGS. 1 and 2 or 13 and 14 installed on an engine of an outboard motor.
Figure 22:
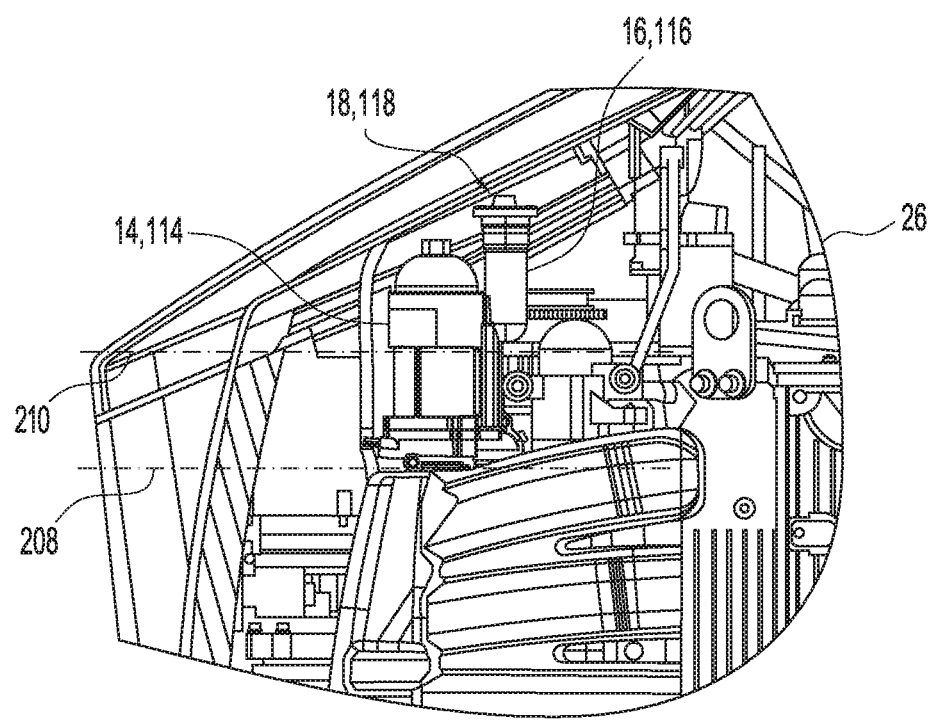
FIG. 22 is a side view of the oil filter assembly installed on the engine.

Turning to FIGS. 21 and 22, the oil filter assembly 10, 110 can be mounted to the engine 26 by way of the engine-mounting interface 30, 130, as noted hereinabove. The orientation of the clean oil fill tube 16, 116 with respect to the filter 14, 114 may depend on existing engine constraints, such as where the oil filter assembly 10, 110 interfaces with the flywheel at 200, with the starter at 202, and with the engine block at 204. Although the airbox is not shown in FIG. 21, the space constraints imposed by the airbox are shown at 206. FIG. 22 shows how the base of the oil filter assembly 10, 110 may be located above the plane 208 of the intake manifold runners, and how the lower end of the clean oil fill tube 16, 116 may need to be located above a plane of engagement 210 between the flywheel and the starter. Other configurations for the oil filter assembly 10, 110 and/or engine 26 are contemplated. However, both of the oil filter assemblies 10, 110 described herein include a base 12, 112 with passageways 52, 152, 94, 194 integral to the base 12, 112 that provide fluid communication between a drain-back port 78, 178 and a low-pressure outlet port 50, 150 and between a clean oil fill passageway 96, 196 and the low-pressure outlet port 50, 150. This provides a compact assembly for a clean oil filter change and for filling the engine 26 with clean oil.

In the present examples, the upstream side of the filter 14, 114 is situated radially outwardly of the downstream side of the filter 14, 114, and the first cup 38, 138 for providing unfiltered oil to the filter 14, 114 is situated radially outwardly of the second cup 42, 142 that receives filtered oil. The base 12, 112 provides fluid communication between the high-pressure inlet port 32, 132 and an inlet side of the filter 14, 114 and between an outlet side of the filter 14, 114 and the high-pressure outlet port 48, 148 when the filter 14, 114 is installed on the filter-mounting interface 40, 140 and the drain-back insert 70, 170 is within the drain-back port 78, 178. However, in other examples, the filter could be designed to accept unfiltered oil into its hollow core, and the low pressure side of the filter could be its outer surface. The passageways in the base 12, 112 would then be configured such that unfiltered oil enters the inner cup and then the filter, and filtered oil exits the filter into the outer cup.

In the above description certain terms have been used for brevity, clarity and understanding. No unnecessary limitations are to be implied therefrom beyond the requirement of the prior art because such terms are used for descriptive purposes only and are intended to be broadly construed. The different components and assemblies described herein above may be used in alone or in combination with other components and assemblies. Various equivalents, alternatives and modifications are possible within the scope of the appended claims.

What is claimed is:

1. An oil filter assembly for an internal combustion engine of an outboard motor, the assembly comprising:
   a base having:
      a high-pressure inlet port receiving oil into the base;
      a filter-mounting interface configured to receive a filter;
      a drain-back port configured to receive a drain-back insert of the filter; and
      an engine-mounting interface configured to mount the base to the engine, the engine-mounting interface including a high-pressure outlet port and a low-pressure outlet port providing oil from the base to the engine;
      wherein the base provides fluid communication between the high-pressure inlet port and an inlet side of the filter and between an outlet side of the filter and the high-pressure outlet port when the filter is installed on the filter-mounting interface and the drain-back insert is within the drain-back port;

wherein the base provides fluid communication between the drain-back port and the low-pressure outlet port when the drain-back insert is not within the drain-back port; and a clean oil fill passageway in fluid communication with the low-pressure outlet port.

2. The oil filter assembly of claim 1, further comprising a clean oil fill opening in fluid communication with the clean oil fill passageway.

3. The oil filter assembly of claim 2, wherein the clean oil fill opening is adjacent the filter mounting interface when the oil filter assembly is viewed in plan.

4. The oil filter assembly of claim 3, wherein the filter includes a cylindrical housing having a center axis and a radius R, and the clean oil fill opening is located fully within a boundary of 3R from the center axis of the filter housing when the filter is installed on the filter mounting interface and the oil filter assembly is viewed in plan.

5. The oil filter assembly of claim 2, further comprising a clean oil fill tube that is configured to extend alongside the filter when the filter is installed on the filter mounting interface, the clean oil fill tube at least in part defining the clean oil fill passageway.

6. The oil filter assembly of 5, wherein the clean oil fill opening is defined at a top end of the clean oil fill tube and is configured to be higher than a top end of the filter when the filter is installed on the filter mounting interface.

7. The oil filter assembly of claim 6, wherein the filter includes a housing having a height H, and the clean oil fill opening is located fully within a boundary of H from a top end of the filter housing when the filter is installed on the filter mounting interface and the oil filter assembly is viewed in elevation.

8. The oil filter assembly of claim 1, further comprising the filter coupled to the filter mounting interface, wherein the filter is a spin-on-type filter.

9. The oil filter assembly of claim 8, wherein the spin-on filter comprises:
   a cylindrical filter element having an outer upstream side and an inner downstream side;
   an end cap supporting the filter element;
   a cylindrical housing holding the filter element and the end cap; and
   an adapter coupled to an end of the housing proximate the end cap;
   wherein the drain-back insert is connected through the adapter to the end cap and thereby couples the adapter to the housing.

10. The oil filter assembly of claim 1, further comprising a clip coupled to the base that is configured to hold a tube for testing an oil level in the engine with a dipstick.

11. The oil filter assembly of claim 1, further comprising passageways integral to the base that provide the fluid communication between the drain-back port and the low-pressure outlet port and between the clean oil fill passageway and the low-pressure outlet port.

12. An oil filter assembly for an internal combustion engine of an outboard motor, the assembly comprising:
    a base having:
        a first passageway for receiving oil into the base;
        a first cup for receiving oil from the first passageway and for delivering oil to an upstream side of a filter when the filter is installed on the base;
        a second cup for receiving oil from a downstream side of the filter when the filter is installed on the base;
        a second passageway for delivering oil from the second cup to the engine;
        a third passageway for delivering oil from the first and second cups to the engine when the filter is not installed on the base;
        a fourth passageway communicating with the third passageway, the fourth passageway for receiving clean oil from a clean oil fill passageway;
    wherein the base is configured to be mounted to the engine such that the second and third passageways are in fluid communication with the engine.

13. The oil filter assembly of claim 12, further comprising a clean oil fill tube at least in part defining the clean oil fill passageway.

14. The oil filter assembly of claim 13, wherein a clean oil fill opening is defined at a top end of the clean oil fill tube, the clean oil fill opening being located adjacent the first cup when the oil filter assembly is viewed in plan.

15. The oil filter assembly of claim 13, wherein a clean oil fill opening is defined at a top end of the clean oil fill tube, the clean oil fill opening being located higher than the filter when the filter is installed on the base.

16. The oil filter assembly of claim 12, further comprising the filter, wherein the filter includes a drain-back insert that prevents oil from flowing into the third passageway when the filter is installed on the base.

17. The oil filter assembly of claim 16, wherein the filter is a spin-on filter and comprises:
    a cylindrical filter element having an outer upstream side and an inner downstream side;
    an end cap supporting the filter element;
    a cylindrical housing holding the filter element and the end cap; and
    an adapter coupled to an end of the housing proximate the end cap;
    wherein the drain-back insert is connected through the adapter to the end cap and thereby couples the adapter to the housing.

18. The oil filter assembly of claim 17, wherein the upstream side of the filter is situated radially outwardly of the downstream side of the filter, and the first cup is situated radially outwardly of the second cup.

19. The oil filter assembly of claim 17, wherein the end cap has an internally threaded opening and the drain-back insert has an externally threaded neck for attaching the drain-back insert to the end cap.

20. The oil filter assembly of claim 12, further comprising a clip coupled to the base that is configured to hold a tube for testing an oil level in the engine with a dipstick.

* * * * *